(12) United States Patent
Wakiyama et al.

(10) Patent No.: US 10,486,921 B2
(45) Date of Patent: Nov. 26, 2019

(54) SHEET ACCOMMODATING DEVICE AND IMAGE FORMING APPARATUS

(71) Applicant: CANON KABUSHIKI KAISHA, Tokyo (JP)

(72) Inventors: Eiji Wakiyama, Yokohama (JP); Tomoki Katafuchi, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/888,349

(22) Filed: Feb. 5, 2018

(65) Prior Publication Data
US 2018/0222702 A1 Aug. 9, 2018

(30) Foreign Application Priority Data

Feb. 6, 2017 (JP) .................. 2017-019175

(51) Int. Cl.
*B65H 1/26* (2006.01)
*H04N 1/00* (2006.01)
(Continued)

(52) U.S. Cl.
CPC ............ *B65H 1/266* (2013.01); *B65H 1/027* (2013.01); *B65H 1/04* (2013.01); *H04N 1/00538* (2013.01); *B65H 2402/32* (2013.01); *B65H 2402/515* (2013.01); *B65H 2405/15* (2013.01); *B65H 2405/31* (2013.01); *B65H 2405/32* (2013.01); *B65H 2405/324* (2013.01); *B65H 2407/50* (2013.01); *H04N 2201/0094* (2013.01)

(58) Field of Classification Search
CPC .......... B65H 1/04; B65H 1/266; B65H 1/027; B65H 2405/31; B65H 2405/32; B65H 2405/324; B65H 2402/32; B65H 2402/515; B65H 2405/15; B65H 2407/50; A47B 88/00; A47B 88/49; A47B 2220/0025; A47B 2210/0018
USPC ..... 271/162, 164; 312/334.8, 334.22, 334.46
See application file for complete search history.

(56) References Cited

U.S. PATENT DOCUMENTS 6,543,758 B2    4/2003  Imura et al.
7,101,081 B2 *  9/2006  Chen .................... A47B 88/493
                                          312/334.46
(Continued)

FOREIGN PATENT DOCUMENTS

JP    H11-079427 A    3/1999
JP    2001-261171 A   9/2001
(Continued)

*Primary Examiner* — David H Bollinger
(74) *Attorney, Agent, or Firm* — Venable LLP

(57) ABSTRACT

A sheet accommodating device includes a housing; a sheet accommodating portion configured to accommodate a sheet and detachably mountable in the housing, the accommodating portion including, a supporting member supporting the accommodating portion so as to be rotatable relative to the housing, a movable member movable relative to the supporting member along the supporting member, a first urging member urging the movable member in a moving direction of the supporting member, a regulating member movable in a direction crossing with the moving direction of the movable member, and a second urging member urging the regulating member so as to protrude it from the movable member. The housing is provided with an engageable member engaged with the regulating member.

20 Claims, 10 Drawing Sheets

(51) Int. Cl.
*B65H 1/04* (2006.01)
*B65H 1/02* (2006.01)

(56) References Cited

U.S. PATENT DOCUMENTS

| | | | |
|---|---|---|---|
| 7,967,287 B2 | 6/2011 | Hamasaki et al. | |
| 7,971,868 B2 | 7/2011 | Matsushima et al. | |
| 2003/0075857 A1* | 4/2003 | Matsuki | B65H 1/04 |
| | | | 271/162 |
| 2007/0045946 A1* | 3/2007 | Nakashima | B65H 1/26 |
| | | | 271/274 |
| 2008/0180764 A1 | 7/2008 | Wakiyama et al. | |
| 2009/0096340 A1* | 4/2009 | Chen | A47B 88/493 |
| | | | 312/334.46 |
| 2009/0121596 A1* | 5/2009 | Ferrari | E05F 5/003 |
| | | | 312/334.8 |
| 2011/0221121 A1 | 9/2011 | Hamasaki et al. | |
| 2013/0062827 A1* | 3/2013 | Fuda | B65H 1/04 |
| | | | 271/147 |
| 2014/0021680 A1* | 1/2014 | Hamasaki | B65H 1/00 |
| | | | 271/147 |
| 2014/0042884 A1* | 2/2014 | Domenig | A47B 88/483 |
| | | | 312/319.1 |
| 2014/0203496 A1* | 7/2014 | Hamasaki | B65H 1/266 |
| | | | 271/18 |

FOREIGN PATENT DOCUMENTS

| | | |
|---|---|---|
| JP | 2005-255280 A | 9/2005 |
| JP | 2012-126575 A | 7/2012 |

\* cited by examiner (a)

(b)

SHEET ACCOMMODATING DEVICE AND IMAGE FORMING APPARATUS

FIELD OF THE INVENTION AND RELATED ART

The present invention relates to a sheet accommodating device, with which an image forming apparatus such as a copying machine, a printing machine, a facsimile machine, and a multifunction apparatus capable of functioning as any of the preceding image forming apparatuses, is provided.

An image forming apparatus such as a copying machine, a printing machine, a facsimile machine, a multifunction image forming apparatus capable of functioning as any of the preceding apparatuses, etc., which forms an image on a sheet of recording medium, has been known to be provided with a sheet accommodating device which is for storing multiple sheets of recording medium which are to be delivered to the image forming portion of the image forming apparatus. A sheet accommodating device is provided with a sheet holding portion in which multiple sheets of recording medium can be held in layers. The sheet holding portion of a sheet accommodating device has to be opened or closed to be replenished with sheets of recording medium. Generally speaking, an image forming apparatus is provided with a mechanism for preventing the problem that as the sheet holding portion is opened, the sheet holding portion sometimes falls out of the main assembly of the sheet accommodating device. Further, when it is necessary to remove a jammed sheet of recording medium in the main assembly of an image forming apparatus, the sheet holding portion has to be uninstalled from, and reinstalled into, the main assembly of the sheet accommodating device. Thus, a sheet accommodating device is provided with a mechanism which makes it possible for its sheet holding portion to be uninstalled from, or reinstalled into, the main assembly of the sheet accommodating device.

One of sheet accommodating devices equipped with a mechanism for preventing its sheet holding portion from falling out of the main assembly of the apparatus is disclosed in Japanese Laid-open Patent Application No. 2012-126575. This sheet accommodating device is provided with a mechanism for preventing the problem that as the sheet holding portion is opened, the sheet holding portion of the sheet accommodating device falls out of the main assembly of the sheet accommodating device, and also, a mechanism for allowing the sheet holding portion to be uninstalled from, or reinstalled into, the main assembly of the sheet accommodating device.

Further, some sheet accommodating devices equipped with a combination of a mechanism for preventing a sheet holding portion from falling out of the main assembly of the sheet accommodating device, and a mechanism for allowing a sheet holding portion to be uninstalled from, or reinstalled into, the main assembly of the sheet accommodating device, are provided with a sheet holding portion of a large capacity, that is, a sheet holding portion in which a substantial number of sheets of recording medium can be stored in layers. In the case of these sheet accommodating devices, their guiding rail portions for guiding the sheet storing portion are provided with roller bearings or the like for allowing the sheet holding portion to be smoothly slide along the guiding rails to be opened or closed. Providing the guiding rail portion of a sheet accommodating device with roller bearings or the like to minimize the resistance which the sheet holding portion is subjected when it is opened or closed sometimes resulted in the following problem. That is, if the sheet holding portion is opened with substantial speed when a large number of sheets of recording medium are in the sheet holding portion, the fall prevention mechanism is subjected to an excessive amount of load, resulting in such a problem that large banding sounds are generated, and/or the mechanism becomes damaged seriously enough to allow the sheet holding portion to unexpectedly fall out of the main assembly of the sheet accommodating device.

SUMMARY OF THE INVENTION

According to an aspect of the present invention, there is provided a sheet accommodating device comprising a housing; a sheet accommodating portion configured to accommodate a sheet and detachably mountable in said housing, said sheet accommodating portion including a supporting member supporting said sheet accommodating portion so as to be rotatable relative to said housing, a movable member movable relative to said supporting member along said supporting member, a first urging member urging said movable member in a moving direction of said supporting member, a regulating member movable in a direction crossing with the moving direction of said movable member, and a second urging member urging said regulating member so as to protrude it from said movable member, wherein said housing is provided with an engageable member engaged with said regulating member.

Further features of the present invention will become apparent from the following description of exemplary embodiments with reference to the attached drawings.

Figure 9:
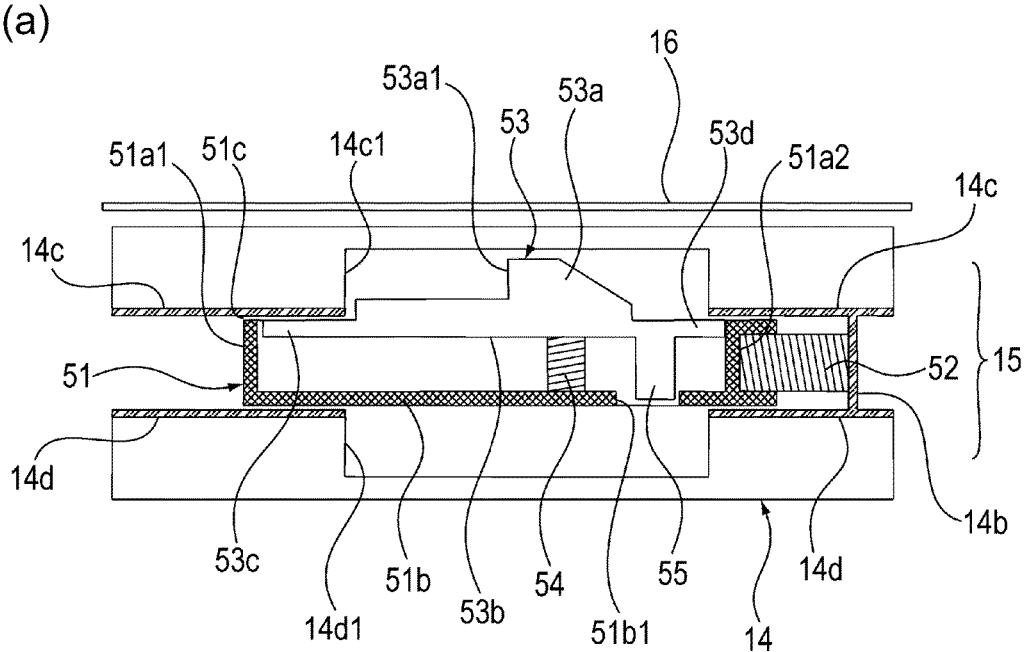
Figure 9:
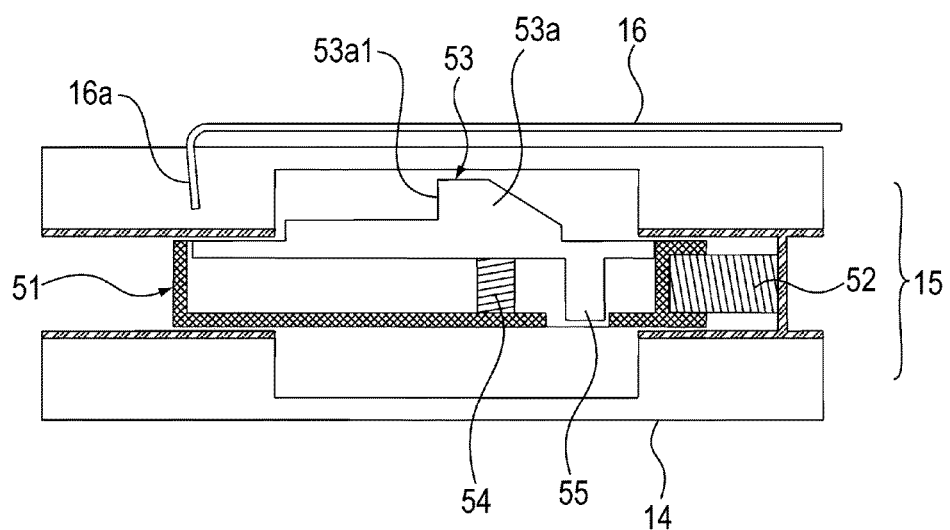

Part (a) of FIG. 9 is a sectional view of the portion of the sheet accommodating device in accordance with the present invention, which is for not only preventing the sheet holding portion of the sheet accommodating device from falling out of the main assembly of the sheet accommodating device, but also, for releasing the sheet holding portion from the main assembly to allowed the sheet holding portion to be taken out of the main assembly. It is for showing and describing the state of this portion when the sheet holding portion is completely in the main assembly. Part (b) of FIG. 9 is a sectional view of the same portion of the sheet accommodating device as the one shown in part (a) of FIG. 9, when the sheet holding portion is practically out of the main assembly, but not far enough for the fall preventing portion to be in contact with the stopper of the main assembly. It is for showing the state of this portion when the portion is in this state.

Figure 10:
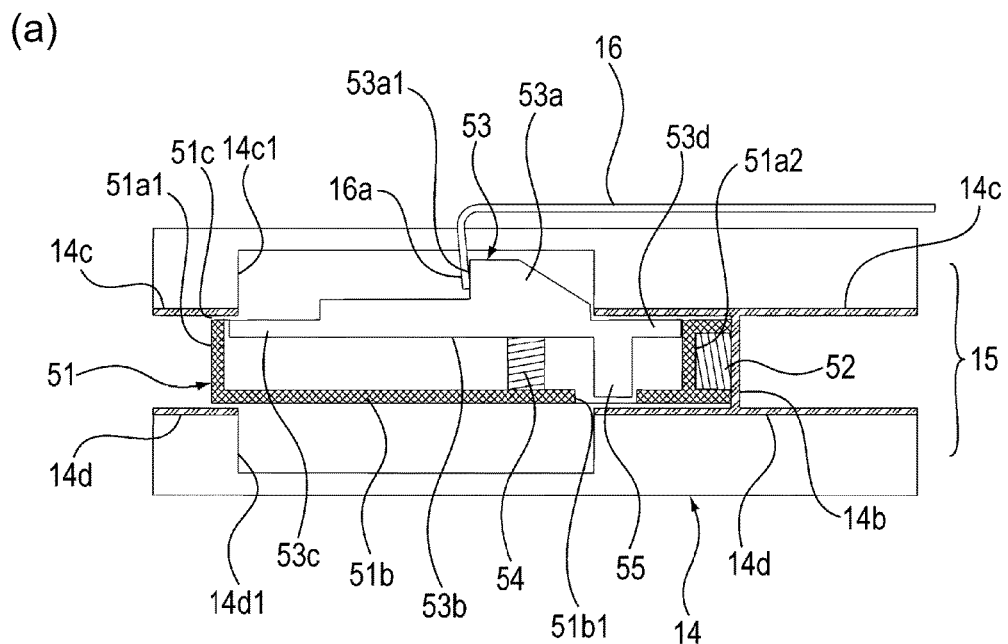
Figure 10:
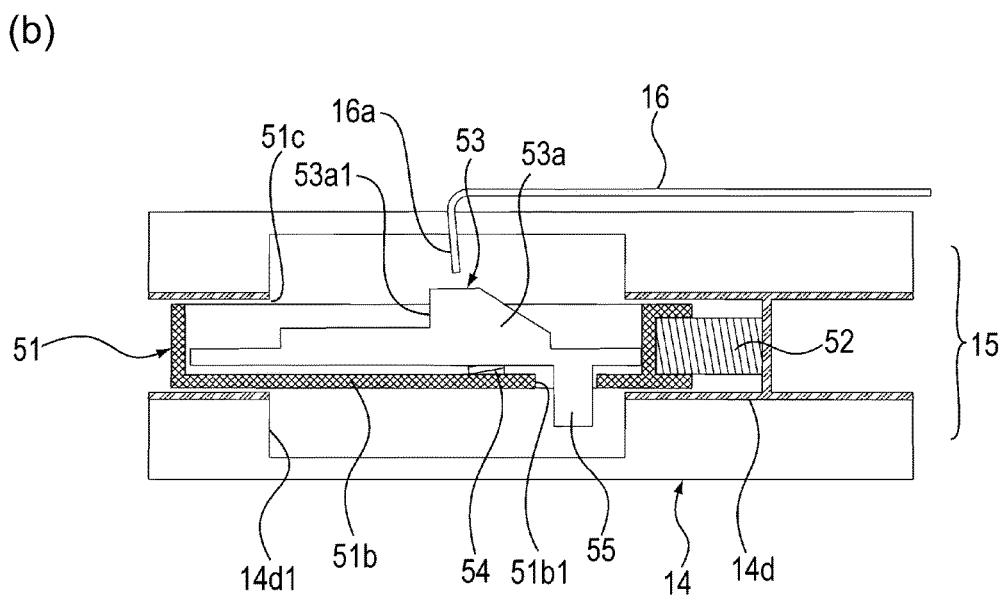

Part (a) of FIG. 10 is a sectional view of the same portion of the sheet accommodating device as the one shown in part (a) of FIG. 9 when the sheet holding portion is out of the main assembly of the sheet accommodating device, far enough for the fall preventing portion of the stationary guide rail. Part (b) of FIG. 10 is the same portion of the sheet accommodating device as the one shown in part (a) of FIG. 9 after the stopper was pushed down before the fall preventing portion comes into contact with the stopper. It is for showing and describing the state of this portion when the portion is in the state shown in part (b) of FIG. 10.

DESCRIPTION OF THE EMBODIMENTS

Hereinafter, referring to appended drawings, the present invention is concretely described with reference to an image forming apparatus equipped with a sheet accommodating device which is in accordance with the present invention.
<Image Forming Apparatus>

Figure 1:
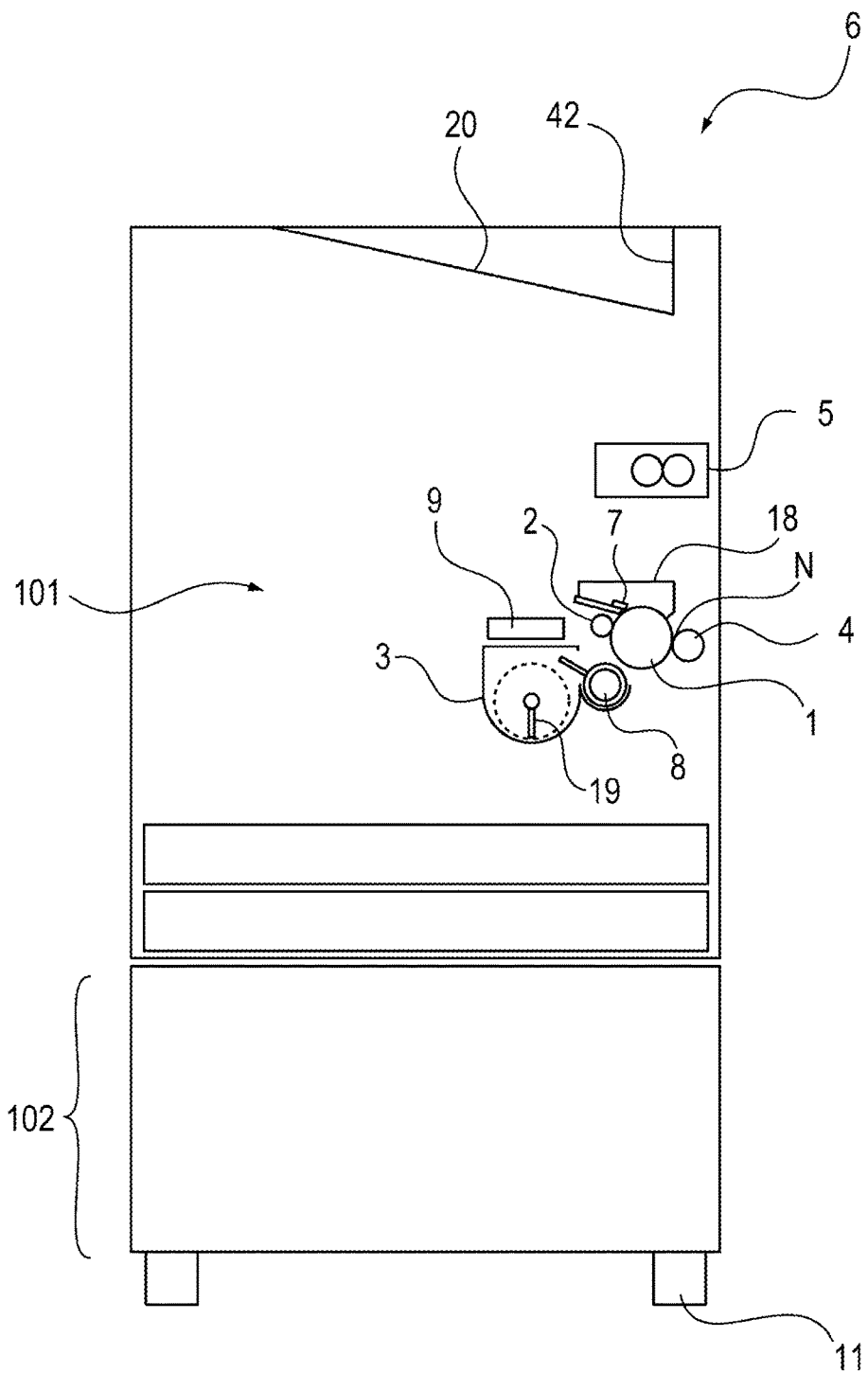
FIG. 1 is a schematic sectional view of an image forming apparatus equipped with a sheet accommodating device which is in accordance with the present invention; it is for showing and describing the structure of the image forming apparatus.

First, referring to FIG. 1, an image forming apparatus 6 equipped with a sheet accommodating device 102 which is in accordance with the present invention is described. FIG. 1 is a schematic sectional view of the image forming apparatus 6 equipped with the sheet accommodating device 102 which is in accordance with the present invention. It shows the structure of the image forming apparatus 6. The image forming apparatus 6 shown in FIG. 1 has a photosensitive drum 1, which is an image bearing member formed of an organic photosensitive substance, for example. It has also a charge roller 2, which is a charging means for uniformly charging the peripheral surface of the photosensitive drum 1 while the photosensitive drum 1 rotates in the counterclockwise direction indicated in FIG. 1. Further, it has a laser scanner 9 which is an exposing means for exposing the photosensitive drum 1.

After the peripheral surface of the photosensitive drum 1 is uniformly charged by the charge roller 2, the laser scanner 9 exposes the peripheral surface of the photosensitive drum 1 by projecting a beam of laser light upon the peripheral surface of the photosensitive drum 1 while modulating the beam according to the information of the image to be formed. As a result, an electrostatic latent image is effected on the peripheral surface of the photosensitive drum 1. Then, the electrostatic latent image on the photosensitive drum 1 is supplied with toner, by a development sleeve 8, as a developer bearing member, with which a developing apparatus 3 is provided. Consequently, the electrostatic latent image is developed into a toner image, that is, a visible image formed of toner. "19" in FIG. 1 stands for a stirring member for stirring the toner in the developing apparatus 3.

Meanwhile, a sheet S of recording medium such paper is fed by an unshown sheet feeding-conveying means, into the main assembly of the image forming apparatus 6 from a sheet feeder tray 103, as a sheet holding portion, in which multiple sheets S of recording medium are held in layers. Then, the sheet S is conveyed by the sheet feeding-conveying means, to a transfer nip N, which is the area of contact between the photosensitive drum 1, and a transfer roller 4 as a transferring means, with preset timing. In the transfer nip N, transfer bias is applied to the transfer roller 4. Thus, the toner image on the peripheral surface of the photosensitive drum 1 is transferred onto the sheet S.

After the transfer of the toner image onto the sheet S, the sheet S is conveyed to a fixing apparatus 5 as a fixing means, through which it is conveyed while remaining pinched between the fixation roller and pressure roller of the fixing apparatus 5. While it is conveyed through the fixing apparatus 5, it is heated and pressed. Consequently, the toner, of which the toner image is formed, is thermally melted. Then, the toner (toner image) becomes fixed to the sheet S as it cools down. Thereafter, the sheet S is discharged onto a delivery tray 20 by being conveyed by an unshown pair of discharge rollers while remaining pinched. The residual toner, or the toner which has failed to be transferred onto the sheet S and therefore, is remaining on the peripheral surface of the photosensitive drum 1, is scraped away from the peripheral surface of the photosensitive drum 1, and is recovered into a container 18 for the recovered toner, by a cleaning blade as a cleaning means.

<Sheet Accommodating Device>

Figure 2:
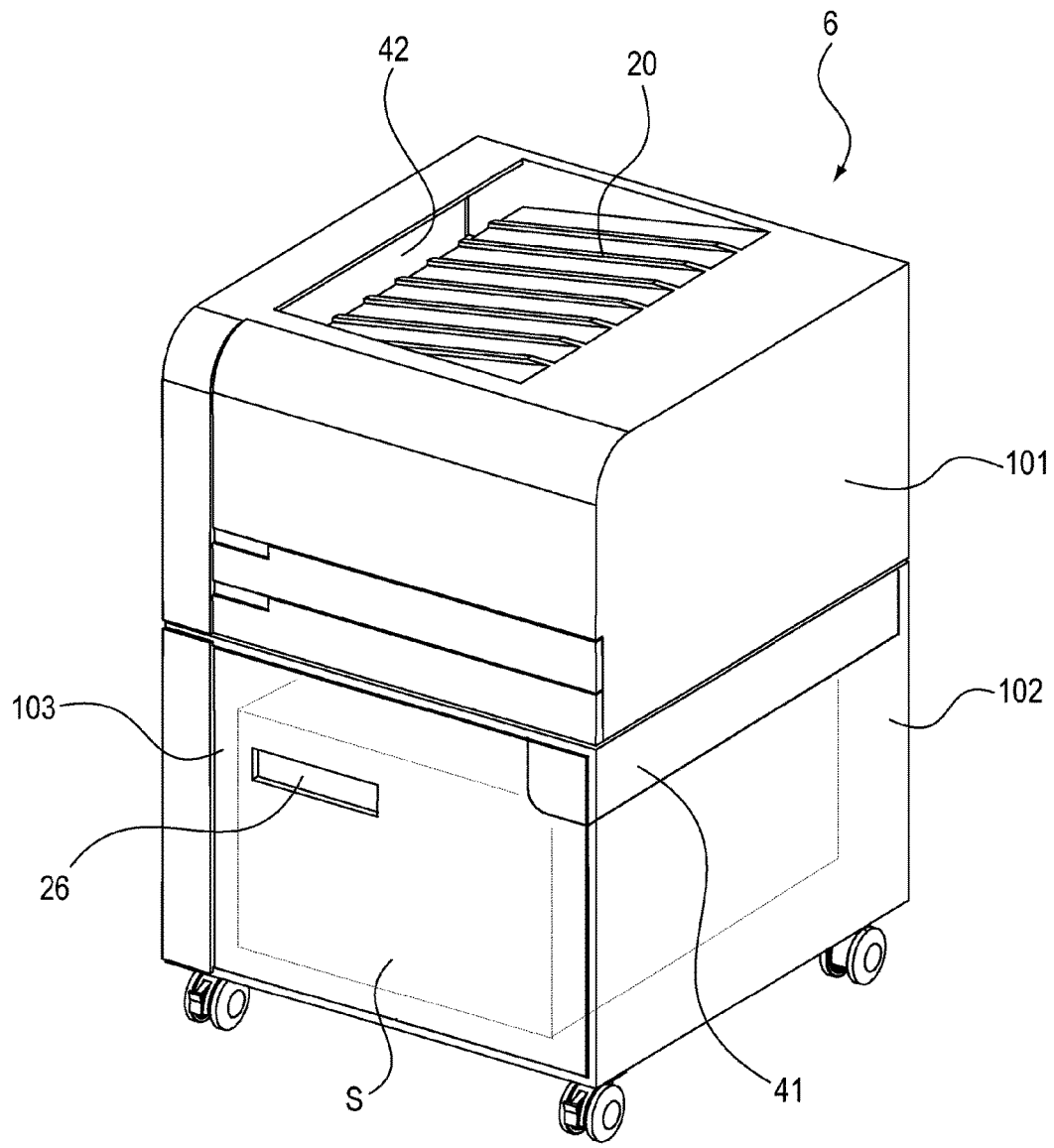
FIG. 2 is a perspective view of the image forming apparatus equipped with a sheet accommodating device which is in accordance with the present invention; it is for showing and describing the structure of the image forming apparatus.
Figure 3:
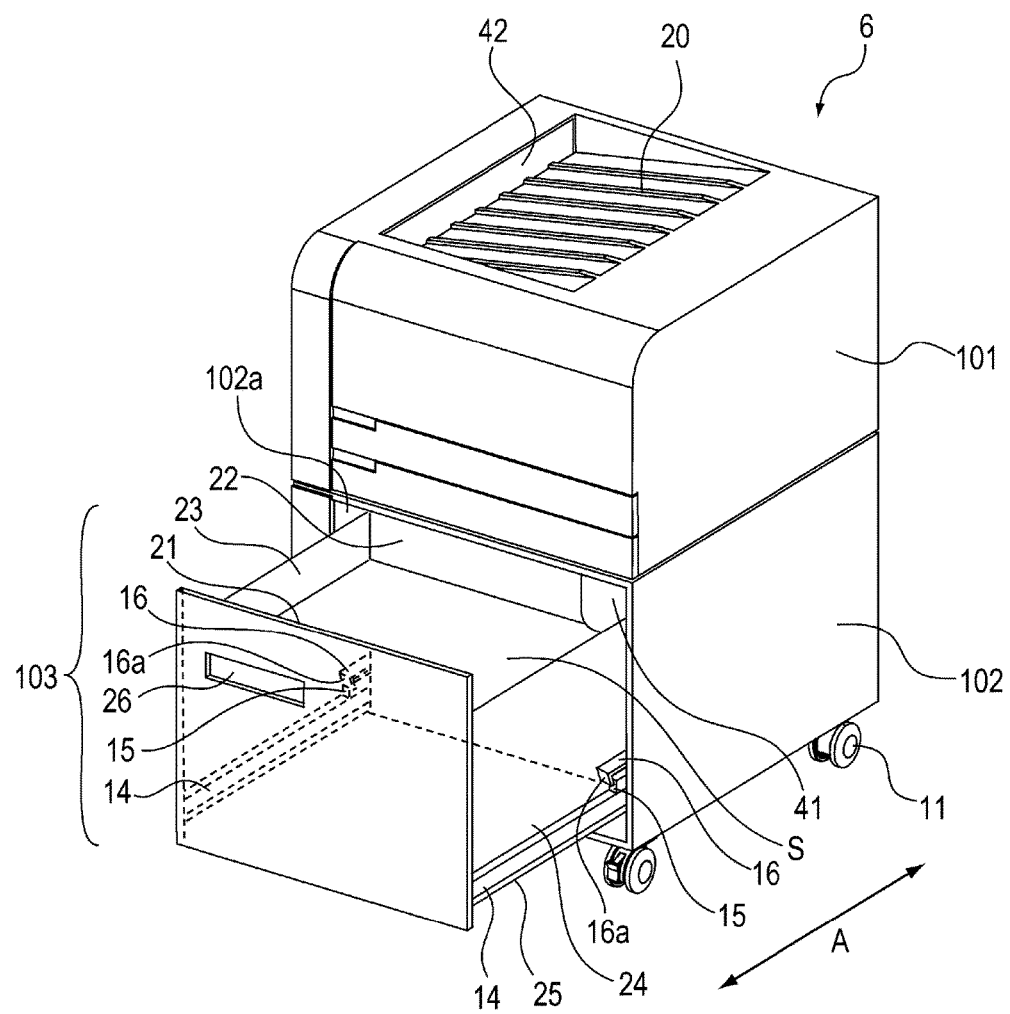
FIG. 3 is a perspective view of the image forming apparatus which is in accordance with the present invention, when the sheet holding portion of its sheet accommodating device is exposed from the main assembly of the sheet accommodating device, as much as possible without being removed from the main assembly of the sheet accommodating device; it is for showing and describing the structure of the image forming apparatus.
Figure 4:
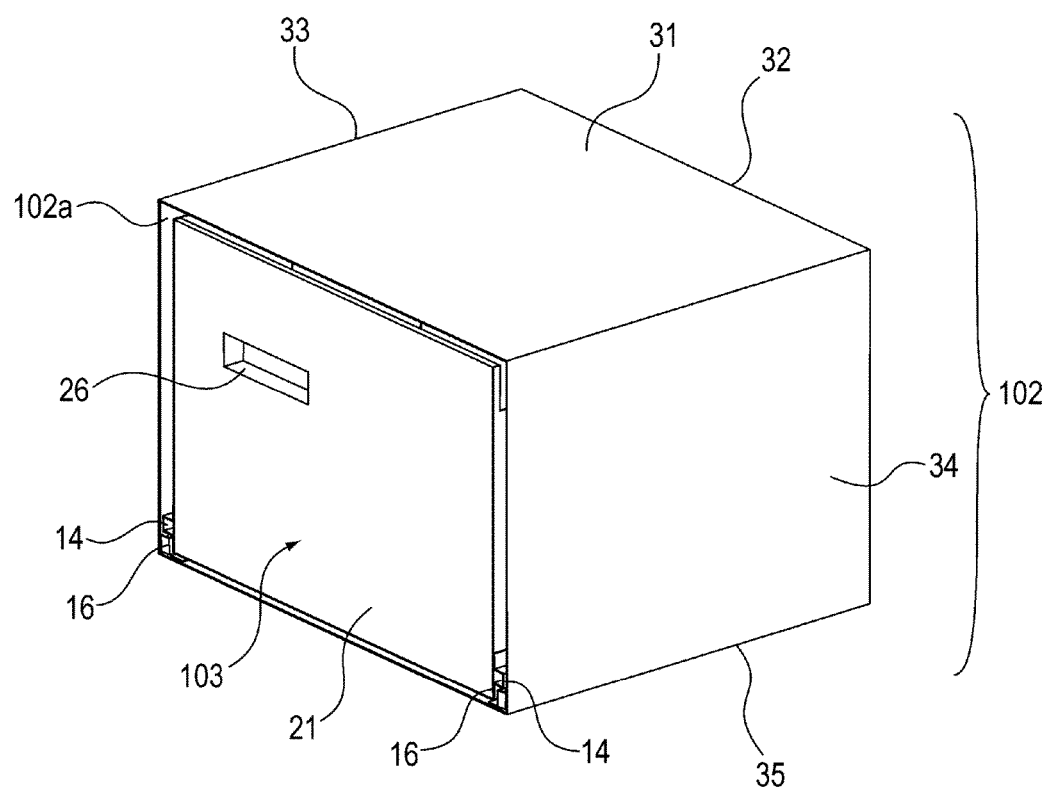
FIG. 4 is a perspective view of the sheet accommodating device which is in accordance with the present invention; it is for showing and describing the structure of the apparatus.

Next, referring to FIGS. 2-10, the sheet accommodating device 102 which is in accordance with the present invention is described about its structure. FIG. 2 is a perspective view of the image forming apparatus 6 equipped with the sheet accommodating device 102. It is for showing and describing the structure of the apparatus 102. FIG. 3 is a perspective view of the sheet accommodating device 102 when a sheet feeding tray 103 of the apparatus 102 is practically out of the main assembly of the sheet accommodating device 102 (main assembly of image forming apparatus). It is for showing and describing the structure of the image forming apparatus 6. FIG. 4 is a perspective view of the sheet accommodating device 102 which is in accordance with the resent invention. It is for showing and describing the structure of the apparatus 102.

Figure 5:
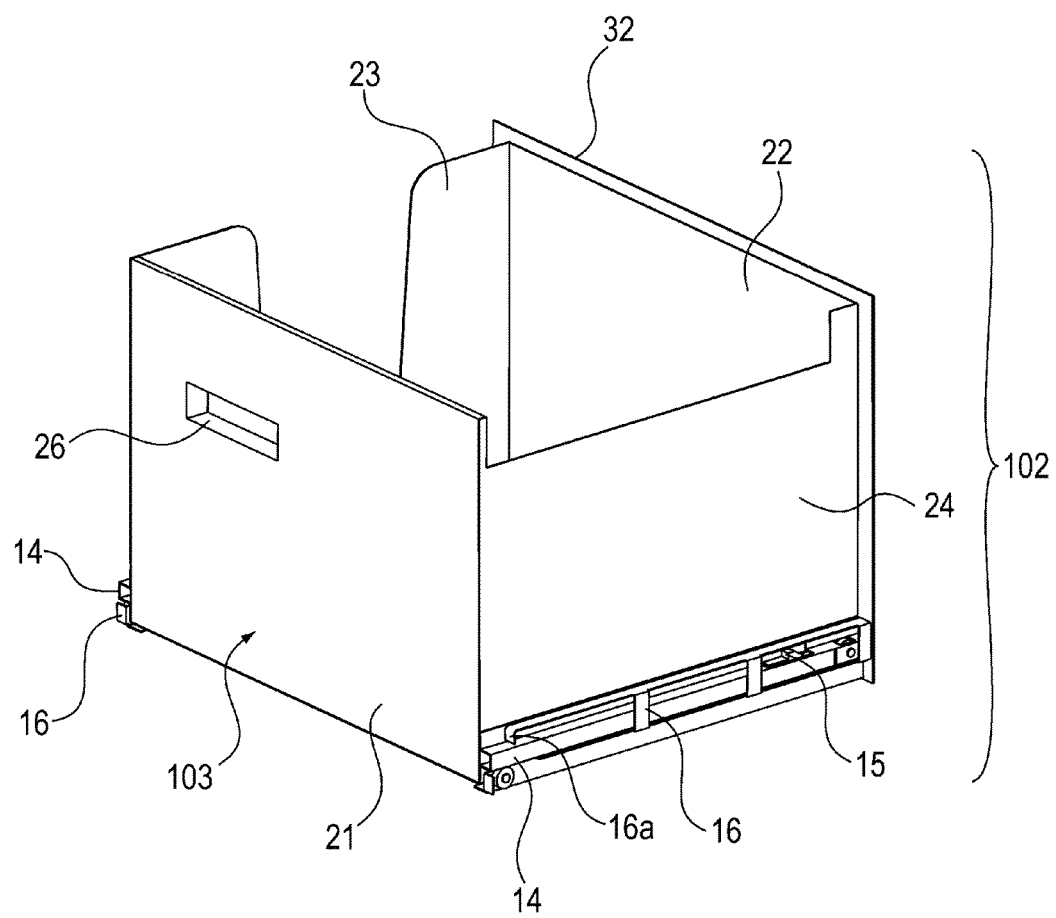
FIG. 5 is a perspective view of the sheet accommodating device which is in accordance with the present invention, when the sheet holding portion is completely in the main assembly of the sheet accommodating device; it is for showing and describing the structure of the apparatus.
Figure 6:
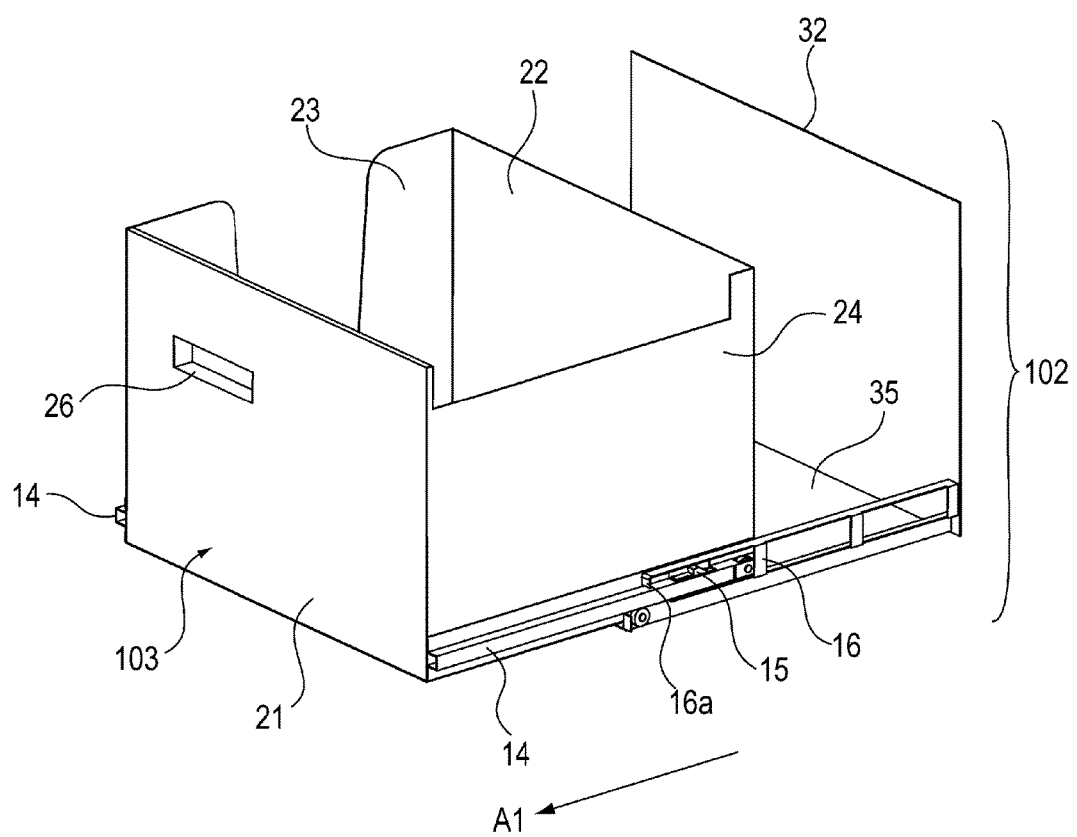
FIG. 6 is a perspective view of the sheet accommodating device which is in accordance with the present invention, when its sheet holding portion is partially (not enough for fall preventing portion of sheet holding portion to contact stopper) out of the main assembly of the sheet accommodating device; it is for showing and describing the structure of the apparatus.
Figure 7:
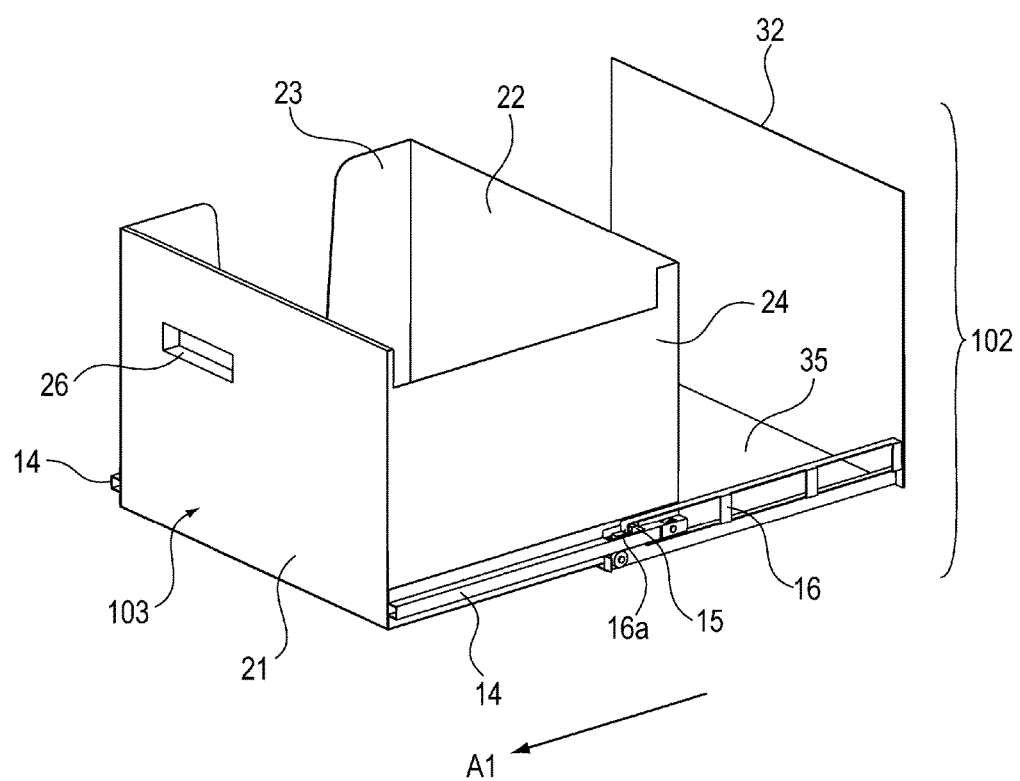
FIG. 7 is perspective view of the sheet accommodating device in accordance with the present invention when its sheet holding portion is completely (far enough for fall preventing portion of sheet holding portion to come into contact with stopper) out of the main assembly of the sheet accommodating device; it is for showing and describing the structure of the apparatus.

FIG. 5 is a perspective view of the sheet accommodating device 102 when the sheet feeding tray 103 (sheet holding portion) is entirely in the sheet accommodating device 102. It is for showing and describing the structure of the apparatus 102. FIG. 6 is a perspective view of the sheet accommodating device 102 when the sheet feeder tray 103 is practically out of the sheet accommodating device 102, but not far enough for the fall preventing portion 16a (engaging member) to be in contact with the stopper 53 (regulating member). It is for showing and describing the structure of the apparatus 102. FIG. 7 is a perspective view of the sheet accommodating device 102 when the sheet feeder tray 103 is out of the sheet accommodating device 102 far enough for the fall preventing member 16*a* (engaging member) to be in contact with the stopper 53. It is for showing and describing the structure of the apparatus 102.

Figure 8:
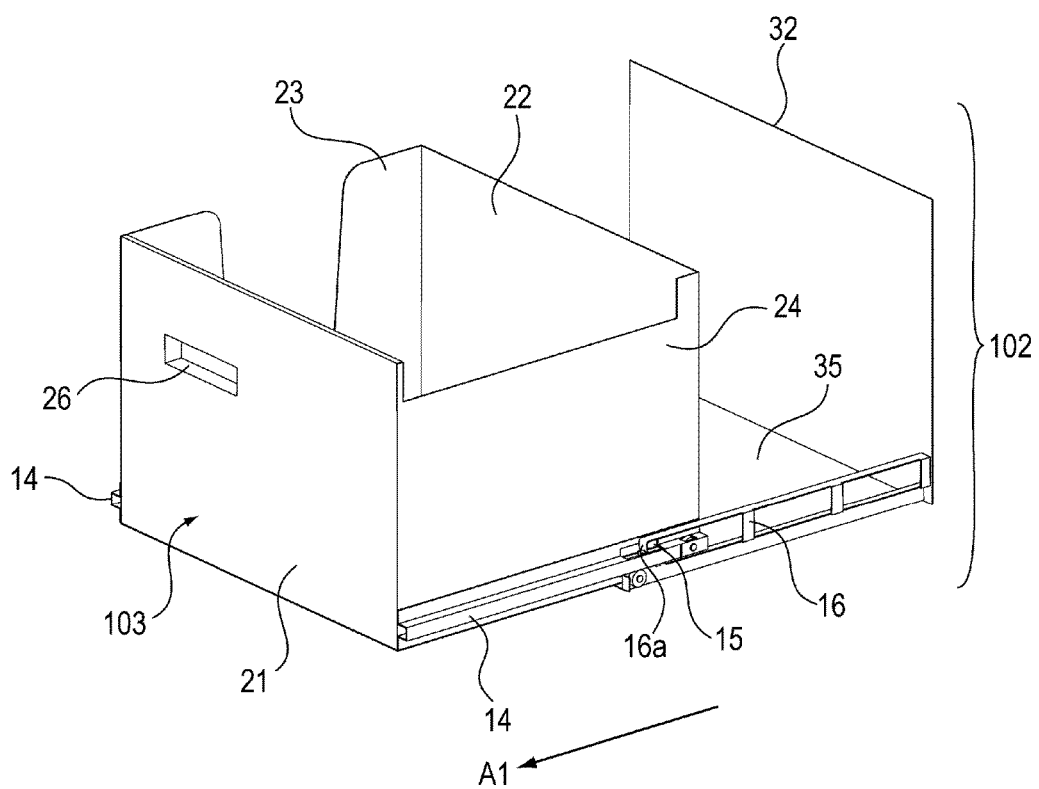
FIG. 8 is a perspective view of the sheet accommodating device which is in accordance with the present invention, when the stopper is held down; it is for showing and describing the structure of the apparatus.

FIG. 8 is a perspective view of the sheet accommodating device 102 when the stopper 53 is in its lowest position. It is for showing and describing the structure of the combination of the main assembly of the sheet accommodating device 102, and sheet feeder tray 103. Part (a) of FIG. 9 is a sectional view of the portion 15 of the sheet accommodating device 102, which is for preventing the sheet feeder tray 103 from falling out of the main assembly of the sheet accommodating device 102, and also, for releasing (or latching) the sheet feeder tray 103 from (to) the main assembly of the sheet accommodating device 102, when the sheet feeder tray 103 (sheet holding portion) is completely in the main assembly of the sheet accommodating device 102. It is for showing and describing this portion 15 of the sheet accommodating device 102. Part (b) of FIG. 9 is a sectional view of the portion 15, shown in part (a) of FIG. 9, when the sheet feeder tray 103 is out of the main assembly of the sheet accommodating device 102, but, not far enough for the fall preventing portion 16*a* to be in contact with the stopper 53. It is for showing and describing the portion 15.

Part (a) of FIG. 10 is a sectional view of a sectional view of the fall preventing and tray releasing portion 15 of the sheet accommodating device 102, shown in part (a) of FIG. 9, when the sheet feeder tray 103 (sheet holding portion) is out of the sheet accommodating device 102, far enough for the fall preventing portion 16*a* (engaging member) to be in contact with the stopper 53. It is for showing and describing the state of the fall preventing and tray releasing portion 15 when the sheet accommodating device 102 is in the state described above. Part (b) of FIG. 10 is a sectional view of the fall preventing and tray releasing portion 15 of the sheet accommodating device 102, shown in part (a) of FIG. 9, right after the stopper 53 was pushed down before the fall preventing portion 16*a* (engaging member) came into contact with the stopper 53. It is for showing and described the state of the fall preventing and tray releasing portion 15 right after the stopper 53 was pushed down.

Referring to FIGS. 2 and 3, the sheet accommodating device 102 is disposed in the bottom portion of the image forming apparatus 6. It is provided with the sheet feeder tray 103, as a sheet holding portion, in which multiple sheets S of recording medium such as paper are storable in layers. The sheet feeder tray 103 is removably installable in the main assembly of the sheet accommodating device 102. Next, referring to FIGS. 3, and 5-8, the sheet accommodating device 102 is provided with a pair of stationary guide rails 16, which are attached to the inward surfaces of the left and right side walls of the main assembly of the sheet accommodating device 102, one for one. On the other hand, the outward surfaces of the left and right walls of the sheet feeder tray 103 are provided with a pair of movable guide rails 14, one for one.

That is, the movable guide rails 14 are attached to the sheet feeder tray 103 (sheet holding portion) to support the sheet feeder tray 103 in such a manner that the sheet feeder tray 103 can be moved relative to the main assembly of the sheet accommodating device 102. The movable guide rails 14 are supported by the stationary guide rails 16 so that the former can be moved along the latter. Thus, the sheet feeder tray 103 can be pulled out of, or pushed back into, the main assembly of the sheet accommodating device 102 in the direction indicated by a two-headed arrow mark A in FIG. 3.

The sheet feeder tray 103 is installable into the main assembly of the sheet accommodating device 102. With the sheet feeder tray 103 remaining installed in the main assembly of the sheet accommodating device 102, the sheets of recording medium in the sheet feeder tray 103 are fed one by one into the main assembly of the image forming apparatus 6, while being separated from the rest of the sheets in the tray 103, by a sheet feeding apparatus 41, as a sheet feeding-conveying means, which is made up of a feed roller, a sheet separating means, etc., which are not shown in the drawings.

The sheets S of recording medium are fed one by one into the main assembly of the image forming apparatus 6 by the sheet feeding-conveying apparatus 41. Then, each sheet S is conveyed to the image forming portion 101 by an unshown conveying means such as a sheet conveyance roller. Then, an image is formed on the sheet S as described before. Thereafter, the sheet S is discharged onto the delivery tray 20 by a sheet discharging portion 42, which is provided with an unshown pair of discharge rollers, etc. The image forming portion 101 forms an image on the sheet S which is sent thereto from the sheet accommodating device 102.

<Sheet Holding Portion>

Referring to FIG. 3, sheet feeder tray 103, which functions as a sheet holding portion, has a front side regulating plate 21, a rear side regulating plate 22, a left side regulating plate 23, a right side regulating plate 24, and a bottom plate 25. Thus, as a large number of sheets S of recording medium are placed in layers on the bottom plate 25, the four edges of each sheet S comes into contact with the front side regulating plate 21, rear side regulating plate 22, left side regulating plate 23, and right side regulating plate 24, whereby the sheet S is regulated in position relative to the sheet feeder tray 103 in which it is stored (held).

It is to the outside surfaces of the left and right side plates of the sheet feeder tray 103 that the aforementioned pair of movable guide rails 14 (supporting rails) for guiding the sheet feeder tray 103 in the direction indicated by the two-headed arrow mark A in FIG. 3 when the sheet feeder tray 103 is pulled out of, or pushed back into, the sheet accommodating device 102, are attached one for one. Each of the movable guide rails 14 is provided with the fall preventing and tray releasing portion 15, shown in FIGS. 9 and 10, has the function of preventing the sheet feeder tray 103 from falling out of the main assembly of the sheet accommodating device 102, and also, the function of allowing the sheet feeder tray 103 to be installed into, or uninstalled from, the main assembly of the sheet accommodating device 102.

On the other hand, it is the inside surfaces of the left and right walls of the main assembly of the sheet accommodating device 102 that are provided with the aforementioned pair of stationary guide rails 16. Not only do the pair of stationary guide rails 16 support the pair of movable guide rails 14 so that the latter are allowed to move along the former, but also, guide the latter in the opening or closing direction indicated by the two-headed arrow mark A in FIG. 3.

The front end portion of each stationary guide rail 16 is provided with a fall preventing portion 16*a*, which comes into contact with the aforementioned portion 15 of the corresponding movable guide rail 14 to prevent the sheet feeder tray 103 from falling out of the main assembly of the sheet accommodating device 102. Referring to FIGS. 9 and 10, the stopper 53 is provided with a protrusive portion 53*a*, which is the top portion of the stopper 53. The fall preventing portion 16*a* is such an engaging member that comes into contact with the contacting surface 53a1 of this protrusive portion 53a of the stopper 53.

<Sheet Accommodating Device>

For the sake of descriptive clarity, the image forming portion 101 which is on the top side of the sheet accommodating device 102, and the caster portion of the sheet accommodating device 102, which is provided with wheels, etc., and which is on the bottom side of the sheet accommodating device 102, are not shown in FIG. 4. Referring to FIG. 4, the sheet accommodating device 102 has a top plate 31, a rear plate 32, a left plate 33, a right plate 34, and a bottom plate 35. The front end of the sheet accommodating device 102 is provided with an opening 102a, through which the sheet feeder tray 103 can be inserted into the main assembly of the sheet accommodating device 102 to be held in the sheet accommodating device 102. The sheet feeder tray 103 is provided with a handle 26, which is attached to the outside surface of the front side regulating plate 21 of the sheet feeder tray 103. The handle 26 can be grasped by a user to pull the sheet feeder tray 103 out of the main assembly of the sheet accommodating device 102, or push the sheet feeder tray 103 into the main assembly of the sheet accommodating device 102, in the direction indicated by the two-headed arrow mark A in FIG. 3.

FIGS. 5-8 show the process of pulling the sheet feeder tray 103 out of the main assembly of the sheet accommodating device 102 in the direction indicated by an arrow mark A1 in FIGS. 6-8. Part (a) of FIG. 9 shows the state of the fall preventing and tray releasing portion 15 when the sheet feeder tray 103 is properly situated in the main assembly of the sheet accommodating device 102.

<Fall Preventing and Tray Releasing Portion 15>

The fall preventing and tray releasing portion 15 has a slider 51 (moving member), as a sliding member, which is supported in such a manner that it can be moved, within an optional range, along the movable guide rail 14 (rail-like member) in the same direction as the direction in which sheet feeder tray 103 is opened or closed as shown by the two-headed arrow mark A in FIG. 3. Further, it has a slider spring 52, which is a compression spring. The slider spring 52 is anchored to the anchoring portion 14b of the movable guide rail 14, by one of its lengthwise ends in terms of the moving direction (left-right direction in FIGS. 9 and 10) of the slider 51. Further, it is anchored to the side surface 51a2 of the other end of the slider 51, by the other lengthwise end. The slider spring 52 is the first pressure applying member for applying pressure to the slider 51 (sliding member) in the direction parallel to the movable guide rail 14.

Further, the fall preventing and tray releasing portion 15 is supported in the slider 51 in such a manner that the portion 15 is allowed to move in the direction (vertical direction in FIGS. 9 and 10) which is perpendicular to the direction (left-right direction in FIGS. 9 and 10) in which the sheet feeder tray 103 is pulled out of, or pushed into, the main assembly of the sheet accommodating device 102. Further, referring to part (b) of FIG. 10, the fall preventing and tray releasing portion 15 has the stopper 53, which can be retracted into the slider 51. The stopper 53 is a part of the slider 51 (sliding member). It is such a stopping member that is movable in the direction (vertical direction of FIGS. 9 and 10) which is perpendicular to the moving direction (left- and right direction) of the slider 51.

Referring to FIGS. 9 and 10, the fall preventing and tray releasing portion 15 is provided with a stopper spring 54 (compression spring) which is anchored to the bottom wall 51b of the slider 51 by one end, and to the bottom wall 53b of the stopper 53 by the other end. The stopper spring 54 is the pressure applying second member which applies pressure to the stopper 53 (stopping member) in the direction to cause the stopper 53 to protrude from the slider 51. The stopper spring 54 applies pressure to the stopper 53 in the upward direction in FIGS. 9 and 10 to make the surface 53a1 of the protrusive portion 53a (top portion) of the stopper 53 protrudes through the opening 51c, with which the top portion of the slider 51 is provided.

<Sliding Member>

Referring to FIGS. 9 and 10, the slider 51 (sliding member) has a bottom wall 51b, and a pair of side walls 51a1 and 51a2 which extend upward from the lengthwise ends of the bottom wall 51a, being therefore U-shaped in cross-section. The slider 51 is movable in the leftward or rightward of FIGS. 9 and 10 along the top and bottom guiding portions 14c and 14d, with which the movable guide rail 14 is provided. The top portion of the slider 51 is provided with an opening 51c. The bottom wall 51b of the slider 51 is provided with an opening 51b1.

<Stopping Member>

Referring to FIGS. 9 and 10, the stopper 53 (stopping member) is fitted in the slider 51, which is U-shaped in cross-section. It is movable in the upward or downward direction of FIGS. 9 and 10 along the side walls 51a1 and 51a2 of the slider 51. Referring to part (a) of FIG. 9, when the stopper 53 is under the pressure generated upward of part (a) of FIG. 9 by the resiliency of the stopper spring 54, a pair of brim-like portions 53c and 53d, with which the left and right end portions of the stopper (part (a) of FIG. 9) are provided, one for one, remain in contact with the top guiding portion 14c, preventing thereby the stopper 53 from moving further upward. The protrusive portion 53a of the stopper 53, which has the contacting surface 53a1, remains in the recess 14c1, with which a part of the top guiding portion 14c is provided.

The stopper 53 is provided with a regulating portion 55, which is protrusive downward from the bottom surface 53b of the stopper 53. Referring to part (b) of FIG. 10, the stopper 53 can be moved downward against the resiliency of the stopper spring 54. As it moves downward, the regulating portion 55 is made to go through the opening 51b1 of the bottom wall 51b of the slider 51, and then, through the opening 14d1, with which a part of the bottom guiding portion 14d is provided.

Referring to FIG. 5, when the sheet feeder tray 103 is in the main assembly of the sheet accommodating device 102, the fall preventing and tray releasing portion 15 is under no pressure from any direction as shown in part (b) of FIG. 9. Therefore, the slider spring 52 and stopper spring 54 are not compressed, remaining therefore in the standby state as shown in part (a) of FIG. 9. Parts (a) and (b) of FIG. 9 and FIG. 10 show the standby position of the stopper 53 (stopping member), in which the stopper 53 is after it was made to protrude from the slider 51 (slidable member) by being pressed by the stopper spring 54 (pressure applying second member).

FIG. 6 and part (b) of FIG. 9 show the state of the fall preventing and tray releasing portion 15 when the sheet feeder tray 103 is practically out of the main assembly of the sheet accommodating device 102, but, not far enough for the contacting surface 53a1 of the stopper 53 to come into contact with the fall preventing portion 16a of the stationary guide rail 16. Referring to part (b) of FIG. 9, although the sheet feeder tray 103 is almost out of the main assembly of the sheet accommodating device 102, it has not been pulled out far enough for the contacting surface 53a1 of the stopper 53 to come into contact with the fall preventing portion 16a of the stationary guide rail 16.

When the fall preventing and tray releasing portion 15 is in the state shown in FIG. 5 and part (b) of FIG. 9, the fall preventing and tray releasing portion 15 is under no pressure from any direction as it is not when the portion 15 is in the state shown in FIG. 5 and part (a) of FIG. 9. Therefore, the slider spring 52 and stopper spring 54 are not compressed, remaining therefore in the standby position and standby state. Parts (a) and (b) of FIG. 9 show the standby position and state of the stopper 53, in which the stopper 53 is remaining before the contacting surface 53a1 of the protrusive portion 53a (top portion of stopper 53) (stopping member) comes into contact with the fall preventing portion 16a (engaging member), which is the front end portion of the stationary guide rail 16 of the main assembly of the sheet accommodating device 102.

FIG. 7 and part (a) of FIG. 10 show the state of the fall preventing and tray releasing portion 15 after the sheet feeder tray 103 was pulled out of the main assembly of the sheet accommodating device 102 far enough for the contacting surface 53a1 of the stopper 53 of the fall preventing and tray releasing portion 15 to come into contact with the fall preventing portion 16a of the stationary guide rail 16. As the sheet feeder tray 103 is pulled out far enough for the contacting surface 53a1 of the stopper 53 of the fall preventing and tray releasing portion 15 to come into contact with the fall preventing portion 16a of the stationary guide rail 16, as shown in FIG. 7 and part (a) of FIG. 10, the contacting surface 53a1 of the stopper 53 of the fall preventing and tray releasing portion 15 begins to be pressed rightward in part (b) of FIG. 10 by the fall preventing portion 16a of the stationary guide rail 16.

The stopper 53 is movable in the slider 51, in the upward or downward direction in part (a) of FIG. 10. Further, the stopper 53 is movable in the leftward or rightward, relative to the movable guide rail 14, by the pressure (load) which it receives from the fall preventing portion 16a. As the sheet feeder tray 103 is pulled outward of the main assembly of the sheet accommodating device 102 after the occurrence of the contact between the contacting surface 15a1 and fall preventing portion 16a of the stationary guide rail 16, the slider 51 is moved, relative to the stationary guide rail 16, in the direction (rightward in part (a) of FIG. 10) to compress the slider spring 52 (compression spring), by the pressure (load) which its receives from the fall preventing portion 16a. As the slider spring 52 is compressed, it reduces the shock which the stopper 53 receives from the fall preventing portion 16a of the stationary guide rail 16. Consequently, the slider 51 and stopper 53 are moved into the positions shown in part (a) of FIG. 10.

Referring to part (b) of FIG. 10, the contacting surface 53a1 of the protrusive portion 53a (top portion) of the stopper 53 (stopping member) comes into contact with the fall preventing portion 16a (engaging member). Further, the impact (load) which the slider 51 (slidable member) received from the fall preventing portion 16a (engaging member) through the stopper 53 (stopping member) is reduced by the slider spring 52 (pressure applying first member). Part (a) of FIG. 10 shows the state in which the slider spring 52 (pressure applying first member) is after it reduced (absorbed) the shock. The fall preventing portion 16a (engaging member) is the front end portion of the stationary guide rail 16 of the main assembly of the sheet accommodating device 102.

Part (a) of FIG. 10 shows where the slider 51 and stopper 53 are after the slider spring 52 absorbed the above-described shock. When the slider 51 and stopper 53 are in the positions shown in part (a) of FIG. 10, the regulating portion 55, which is such a portion of the stopper 53 that is downwardly protrusive from the brim-like rear portions of the stopper 53, is put through the opening 51b1, with which the bottom wall 51b of the slider 51 is provided, and is in contact with the bottom guiding portion 14d of the movable guide rail 14. Thus, it becomes impossible for the stopper 53 to be moved back into the slider 51.

Referring to FIG. 7 and part (a) of FIG. 10, the sheet feeder tray 103 can be pulled outward of the main assembly of the sheet accommodating device 102 until the contacting surface 53a1 of the stopper 53 of the fall preventing and tray releasing portion 15 comes into contact with the fall preventing portion 16a of the stationary guide rail 16.

Once the sheet feeder tray 103 is pulled out of the main assembly of the sheet accommodating device 102 as far as shown in part (a) of FIG. 10, the fall preventing portion 16a of the stationary guide rail 16 remains in contact with the contacting surface 53a1 of the stopper 53. Thus, it is ensured that the sheet feeder tray 103 does not fall out of the main assembly of the sheet accommodating device 102. The stopper 53 (stopping member) has the regulating portion 55 (regulating portion).

Referring to part (a) of FIG. 10, the regulating portion 55 (regulating portion) prevents the stopper 53 (stopping member) from being moved into the slider 51 as shown in part (a) of FIG. 10 when the slider 51 is (sliding member) in its shock absorbing position. Next, referring to part (b) of FIG. 10, the regulating portion 55 (regulating portion) of the stopper 53 (stopping member) extends through the opening 51b1 (first opening) of the slider (sliding member), and contacts the guide portion 14d of the bottom portion 14d of the movable guide rail 14. Thus, the stopper 53 (stopping member) is prevented from being moved into the stopper position in the slider 51 (sliding member), shown in part (b) of FIG. 10.

FIG. 8 and part (b) of FIG. 10 show the state of the sheet accommodating device 102 and that of the fall preventing and tray releasing portion 15, in which the sheet accommodating device 102 and the portion 15 will be if the stopper 53 is pressed before the contacting surface 53a1 of the stopper 53 comes into contact with the fall preventing portion 16a of the stationary guide rail 16. Referring to FIG. 8 and part (b) of FIG. 10, if the sheet feeder tray 103 in the sheet accommodating device 102 is pulled in the direction indicated by the arrow mark A1 in FIG. 8 while the stopper 53 of the fall preventing and tray releasing portion 15 is kept pressed downward, the protrusive portion 53a of the stopper 53 is allowed to move outward on the bottom side of the fall preventing portion 16a of the stationary guide rail 16. Thus, it is possible to separate the sheet feeder tray 103 from the main assembly of the sheet accommodating device 102; it is possible to take the sheet feeder tray 103 out of the main assembly of the sheet accommodating device 102.

As the stopper 53 of the fall preventing and tray releasing portion 15 is pushed down, as shown in part (a) of FIG. 10, before the contacting surface 53a1 of the stopper 53 of the fall preventing and tray releasing portion 15 comes into contact with the fall preventing portion 16a of the stationary guide rail 16 as shown in part (a) of FIG. 10, the regulating portion 55, which extends downward from the main portion of the stopper 53, is put through the opening 51b1 of the bottom wall 51b of the slider 51, and enters the opening 14d1, with which a part of the bottom guiding portion 14d is provided.

That is, the stopper 53 (stopping member) comes into contact with the fall preventing portion 16a (engaging portion). However, before the stopper 53 comes into contact with the fall preventing portion 16a, the stopper 53 of the fall preventing and tray releasing portion 15 is to be pushed down as shown in part (b) of FIG. 10 against the resiliency of the stopper spring 54 (pressure applying second member). As the stopper 53 is pushed down, the regulating portion 55, goes though the opening 51b1 of the bottom wall 51b of the slider 51, and enters the opening 14d1 (second opening) the opening 14d1, with which the movable guide rail 14 (rail-like member) is provided.

Thus, the regulating portion 55 does not come into contact with the bottom guide portion 14d of the movable guide rail 14. Therefore, the stopper 53 can be retracted into the slider 51. Part (b) of FIG. 10 shows the position in the slider 51 (sliding member), into which the stopper 53 is retracted against the resiliency of the stopper spring 54 (pressure applying second member).

With the sheet accommodating device 102 being configured as described above, even if the sheet accommodating device 102 is structured so that its movable guide rail 14 is provided with the fall preventing and tray releasing portion 15, and also, that it is equipped with the sheet feeder tray 103 capable of accommodating in layers a large number of sheets S of recording medium, it is possible to prevent the problem that as the sheet feeder tray 103 is pulled outward of the main assembly of the sheet accommodating device 102, a large banging sound is generated, and/or the sheet feeder tray 103 and/or sheet accommodating device 102 is damaged. Further, it is possible for a user to remove the sheet feeder tray 103 from the main assembly of the sheet accommodating device 102, or reinstall the sheet feeder tray 103 back into the main assembly of the sheet accommodating device 102, without lifting the sheet feeder tray 103.

By the way, this embodiment is one of the examples of the present invention, in which the movable guide rail 14 is provided with the fall preventing and tray releasing portion 15. However, it is not mandatory that it is the movable guide rail 14 that is provided with the fall preventing and tray releasing portion 15. That is, the present invention is also compatible with a sheet accommodating device 102 structured so that other portions of the sheet accommodating device 102 than the movable guide rails 14 are provided with the fall preventing and tray releasing portion 15. For example, the present invention is compatible with a sheet accommodating device structured so that its unshown main frame or sheet feeder tray 103 is provided with the fall preventing and tray releasing portions 15.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-019175 filed on Feb. 6, 2017, which is hereby incorporated by reference herein in its entirety.

What is claimed is:

1. A sheet accommodating device comprising:
   a housing; and
   a sheet accommodating portion configured to accommodate a sheet and being detachably mountable in said housing, said sheet accommodating portion including
   (a) a supporting member supporting said sheet accommodating portion so as to be movable relative to said housing,
   (b) a movable member movable relative to said supporting member along said supporting member,
   (c) a first urging member urging said movable member in a moving direction of said supporting member,
   (d) a regulating member movable in a direction crossing with the moving direction of said movable member, and
   (e) a second urging member urging said regulating member so as to protrude said regulating member from said movable member,
   wherein said housing is provided with an engageable member engaged with said regulating member.

2. A sheet accommodating device according to claim 1, wherein said supporting member includes a support rail extending along a mounting and dismounting direction of said sheet accommodating portion.

3. A sheet accommodating device according to claim 1, wherein said first urging member includes a spring having one end portion fixed to said supporting member and the other end portion fixed to said movable member.

4. A sheet accommodating device according to claim 3, wherein said first spring is compressed by contacting between said engageable member and said regulating member.

5. A sheet accommodating device according to claim 4, wherein said regulating member includes an accommodation regulating portion projecting from said regulating member, said accommodation regulating portion being contactable to a lower guide portion provided on said supporting member.

6. A sheet accommodating device according to claim 5, wherein said accommodation regulating portion is in contact with said lower guide portion in a state that engageable member and said regulating portion are in contact with each other and said first spring is compressed.

7. A sheet accommodating device according to claim 6, wherein said movable member is provided with an opening capable of accommodating said accommodation regulating portion.

8. An image forming apparatus comprising:
   a main assembly;
   an image forming station provided in said main assembly and configured to form an image on a sheet;
   a feeding unit configured to feed the sheet to said image forming station; and
   a sheet accommodating device configured to accommodate the sheet fed to said feeding unit, said sheet accommodating device including a sheet accommodating portion configured to accommodate a sheet, said sheet accommodating portion including
   (a) a supporting member supporting said sheet accommodating portion so as to be movable relative to the main assembly,
   (b) a movable member movable relative to said supporting member along said supporting member,
   (c) a first urging member urging said movable member in a moving direction of said supporting member,
   (d) a regulating member movable in a direction crossing with the moving direction of said movable member, and
   (e) a second urging member urging said regulating member so as to protrude said regulating member from said movable member,
   wherein said main assembly is provided with an engageable member engaged with said regulating member.

9. An apparatus according to claim 8, wherein said supporting member includes a support rail extending along a mounting and dismounting direction of said sheet accommodating portion.

10. An apparatus according to claim 8, wherein said first urging member includes a spring having one end portion fixed to said supporting member and the other end portion fixed to said movable member.

11. An apparatus according to claim 10, wherein said first spring is compressed by contacting between said engageable member and said regulating member.

12. An apparatus according to claim 11, wherein said regulating member includes an accommodation regulating portion projecting from said regulating member, and said accommodation regulating portion being contactable to a lower guide portion provided on said supporting member.

13. An apparatus according to claim 12, wherein said accommodation regulating portion is in contact with said lower guide portion in a state that engageable member and said regulating portion are in contact with each other and said first spring is compressed.

14. An apparatus according to claim 13, wherein said movable member is provided with an opening capable of accommodating said accommodation regulating portion.

15. A sheet accommodating device comprising:
a housing including a guide member; and
a sheet accommodating portion configured to accommodate a sheet and being detachably mountable in said housing, said sheet accommodating portion including
(a) a guided member to be guided by said guide member, said guided member being configured to guide movement of said sheet accommodating portion relative to said housing in a direction of mounting and dismounting of said sheet accommodating portion;
(b) a movable member supported by said guided member and movable in the mounting and dismounting direction of said sheet accommodating portion;
(c) a first urging member urging said movable member in a moving direction of said guided member;
(d) a regulating member engageable with an engaging member provided on said guide member, said regulating member being configured to prevent disengagement of said sheet accommodating portion from said guide member; and
(e) a second urging member urging said regulating member,
wherein said regulating member is movable by said second urging member in a direction crossing with a moving direction of said movable member, and said regulating member is in a position projected from said movable member by said second urging member when said regulating member is to engage with the engaging member.

16. A sheet accommodating device according to claim 15, wherein said movable member is capable of accommodating said regulating member.

17. A sheet accommodating device according to claim 16, wherein said guided member includes a rail extending along the mounting and dismounting direction of said sheet accommodating portion.

18. A sheet accommodating device according to claim 17, wherein said first urging member includes a spring having one end portion fixed to said guided member and having another end portion fixed to said movable member.

19. A sheet accommodating device according to claim 15, wherein said regulating member includes an accommodation regulating portion projecting from said regulating member, said accommodation regulating portion being contactable to a lower guide portion provided on said guided member.

20. A sheet accommodating device according to claim 19, wherein said accommodation regulating portion is in contact with said lower guide portion in a state that the engaging member and said regulating portion are in contact with each other and said first spring is compressed.

* * * * *